(12) United States Patent
Kato

(10) Patent No.: US 8,035,049 B2
(45) Date of Patent: Oct. 11, 2011

(54) SLIDE OPERATING DEVICE

(75) Inventor: Kojiro Kato, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 0 days.

(21) Appl. No.: 11/850,611

(22) Filed: Sep. 5, 2007

(65) Prior Publication Data

US 2008/0073191 A1 Mar. 27, 2008

(30) Foreign Application Priority Data

Sep. 21, 2006 (JP) ................... 2006-255480

(51) Int. Cl.
*H01H 3/00* (2006.01)
*H01H 13/00* (2006.01)

(52) U.S. Cl. ................ 200/329; 200/536; 33/706

(58) Field of Classification Search ............ 200/329
See application file for complete search history.

(56) References Cited

U.S. PATENT DOCUMENTS

| 4,332,987 | A | * | 6/1982 | Hoffman ................. 200/16 D |
| 4,745,351 | A | * | 5/1988 | Rowen et al. ............ 323/239 |
| 4,886,946 | A | * | 12/1989 | Franks, Jr. .............. 200/329 |
| 5,322,938 | A | * | 6/1994 | McPherson et al. ...... 536/24.1 |
| 5,434,602 | A | | 7/1995 | Kaburagi et al. |
| 5,534,692 | A | | 7/1996 | Nakayama |
| 6,145,213 | A | * | 11/2000 | Shimano et al. ........... 33/702 |
| 6,145,214 | A | * | 11/2000 | Shimano et al. ........... 33/706 |
| 2007/0002488 | A1 | | 1/2007 | Kato |

FOREIGN PATENT DOCUMENTS

| JP | 05-318869 | | 12/1993 |
| JP | 06-102936 | | 4/1994 |
| JP | 2003-021541 | | 1/2003 |
| JP | 2006-49302 | | 2/2006 |
| JP | 2006-242709 | A | 9/2006 |

OTHER PUBLICATIONS

Office Action for Japanese Patent Application No. 2006-255480, dated Sep. 30, 2008.
Office Action mailed Jan. 22, 2010, for CN Application No. 200710140653X, with English Translation, 10 pages.

* cited by examiner

*Primary Examiner* — Renee Luebke
*Assistant Examiner* — Lheiren Mae Caroc
(74) *Attorney, Agent, or Firm* — Morrison & Foerster LLP

(57) ABSTRACT

A slide operating device (e.g., fader device of a mixer) has a moving block 5 which is slidable along a moving guide 3 and a secondary moving guide 4. The moving guide 3 is composed of a non-magnetic stainless shank 31 and a scale portion 32 formed by magnetizing a permanent magnetic member to have magnetic poles (markings). The moving block 5 is provided with a magnetic sensor 7 opposed to the scale portion 32. The magnetic sensor 7 senses magnetic poles provided on the scale portion 32. Mounting hardware 11A, 11B are provided as stoppers which stop a lever 6a of an operating knob 6. Areas outside a range sandwiched between the stoppers where the magnetic sensor 7 is allowed to travel are dead zones 3A, 3B which do not have magnetic poles. Even if the magnetic sensor 7 travels beyond the points where the operating knob 6 is expected to stop due to an excessive force exerted on the operating knob, the slide operating device can prevent from keeping abnormal count which could be caused by sensing of magnetic poles by the magnetic sensor 7.

8 Claims, 5 Drawing Sheets

SLIDE OPERATING DEVICE

BACKGROUND OF THE INVENTION

1. Field of the Invention

The present invention relates to an incremental encoding slide operating device which detects a position of an operating knob by sensing markings such as magnetic poles provided on a linear scale with a sensor portion which travels along the linear scale.

2. Description of the Related Art

As disclosed in Japanese Patent Laid-Open Publication No. 2006-49302 and Japanese Patent Laid-Open Publication No. 2003-21541, for example, such a slide operating device is employed as a fader device for setting a parameter, the fader device being provided on a mixing console.

Japanese Patent Laid-Open Publication No. 2006-49302 discloses a slide operating device having a magnetic linear scale. In the disclosed slide operating device, a magnetic sensor composed of an MR element is mounted to a moving block, while a magnetic pattern in which a north pole and a south pole are alternately arranged is applied as markings to one of paired parallel guides which hold the moving block. In this disclosed art, when the moving block travels by a manual operation of a slide operator or by actuation of a motor, the magnetic sensor outputs pulse signals in accordance with the magnetic poles of the linear scale to allow the detection of the amount (length) of travel of the moving block in accordance with the number of the pulse signals.

Japanese Patent Laid-Open Publication No. 2003-21541 discloses a non-contact digital fader. In this non-contact digital fader, when a moving member travels by a manual operation of a knob or by actuation of a motor, an optical sensor reads a pattern of light and dark recorded on a linear scale to count a relative position on the linear scale to calculate the position of the optical sensor. In this conventional art, the non-contact digital fader also has a sensor for sensing a reference position.

DISCLOSURE OF THE INVENTION

As for the control over input to the fader device having such a linear scale, on turn-on of an apparatus or on assignment of a function to the fader device, a motor is actuated to define an initial position of an operating knob of the fader device and a corresponding value on the scale. In addition, the conventional devices are designed to control in enhanced resolution by using up an entire travelling range (between stoppers on the both ends) of an operating knob to allow user's subtle settings. In some devices having a self-judgement capability at initial setting of the position of an operating knob, furthermore, the operating knob is moved under the control of a motor to control count on a scale.

In the conventional fader devices having the above-described configurations, if a force strong enough so that the operating knob extrudes a stopper even momentarily is accidentally exerted, the stopper can bend, or even if the stopper escapes the bending, a sensor portion (massive) itself can travel to an unexpected position due to momentum, so that the fader devices exhibit an unexpected behavior. More specifically, the conventional fader devices can keep excessive count.

In addition, there are conventional devices employing a sensor which detects a reference position as disclosed in Japanese Patent Laid-Open Publication No. 2003-21541 or a sensor which detects a zero-count point referred to as phase Z, however, these conventional devices present a problem of high cost.

An object of the present invention is to provide an incremental encoding slide operating device (e.g., a fader device) which detects a position of an operating knob by sensing markings on a linear scale with a sensor portion, the slide operating device preventing malfunction in control even if a stopper of the slide operating device is extruded by an excessive travel of an operating knob, or if the sensor portion travels to an unexpected position due to momentum.

The slide operating device of the present invention is provided with dead zones to which the sensor portion is insensible, the dead zones being provided on the linear scale and located outside points where the operating knob is stopped by the stopper portions. The slide operating device of the present invention prevents the sensor portion from outputting unexpected signals even if the sensor portion travels beyond the points where the operating knob is stopped by the stopper portions.

The stopper portions for stopping the operating knob (and the sensor portion) may be designed to contact part of the operating knob.

The slide operating device of the present invention may be designed such that the direction in which the operating knob and the sensor portion travel, that is, the longitudinal direction of the linear scale is oriented in the front direction of a user, that is, in the direction away from the front of the user (or in the direction approaching the user). This arrangement is effective, for the user can easily exert a force on the operating knob.

The slide operating device may be designed such that a plurality of functions is selectively assigned to the operating knob. In this case, the operating knob has to be positioned at an appropriate position on each assignment of a function to the operating knob, however, the slide operating device assures appropriate positioning of the operating knob for each function.

In addition, the sensor portion and the linear scale may be either magnetic or optical.

The slide operating device according to the present invention can prevent unexpected signals output from the sensor portion even if the stopper portion is extruded due to excessive traveling of the operating knob or even if the sensor portion travels to an unexpected position due to excessive momentum, avoiding misoperation in control.

DESCRIPTION OF THE PREFERRED EMBODIMENT

Figure 1:
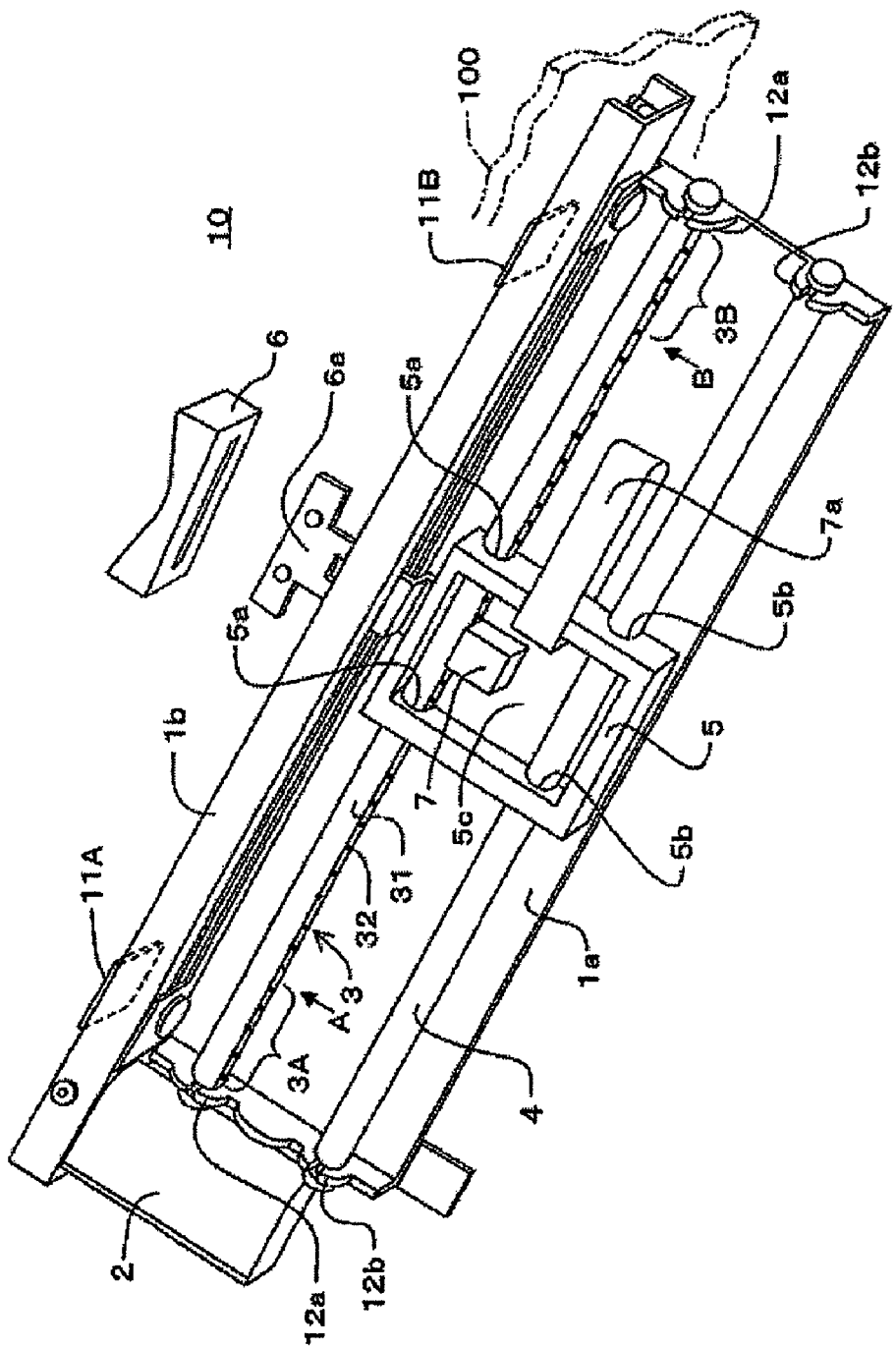
FIG. 1 is a perspective view showing a main part of a fader device used as a slide operating device applied to an embodiment of the present invention.
Figure 2:
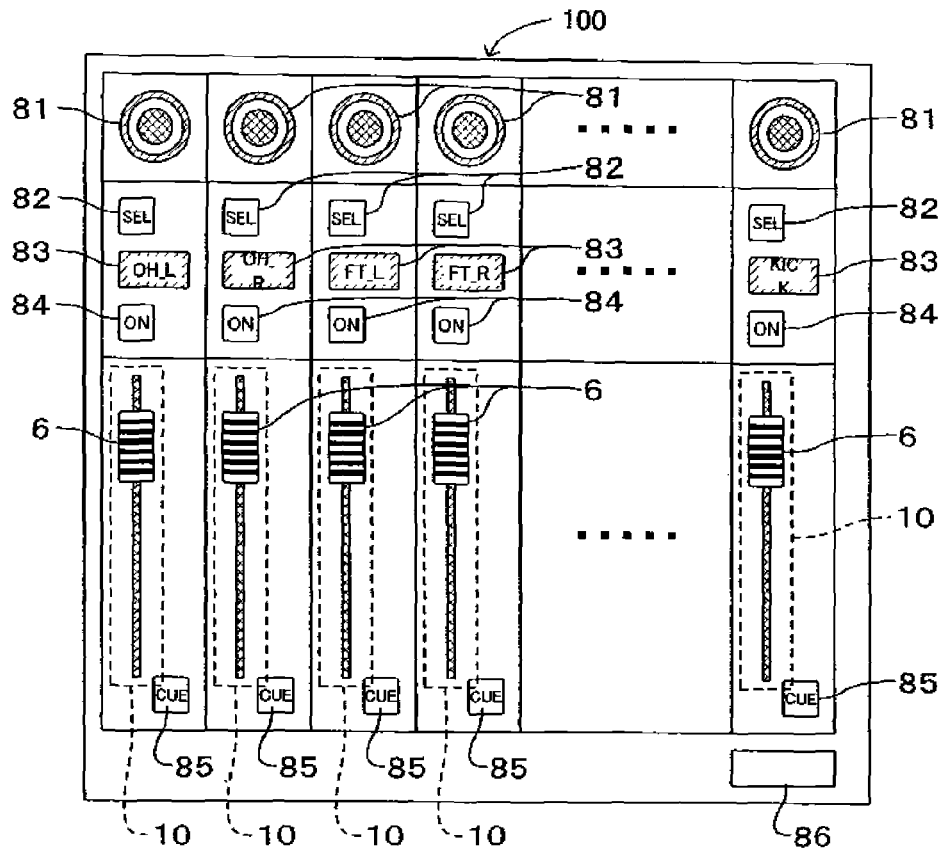
FIG. 2 is a front view showing a main part of a panel of a digital mixer which employs the fader device.
Figure 3:
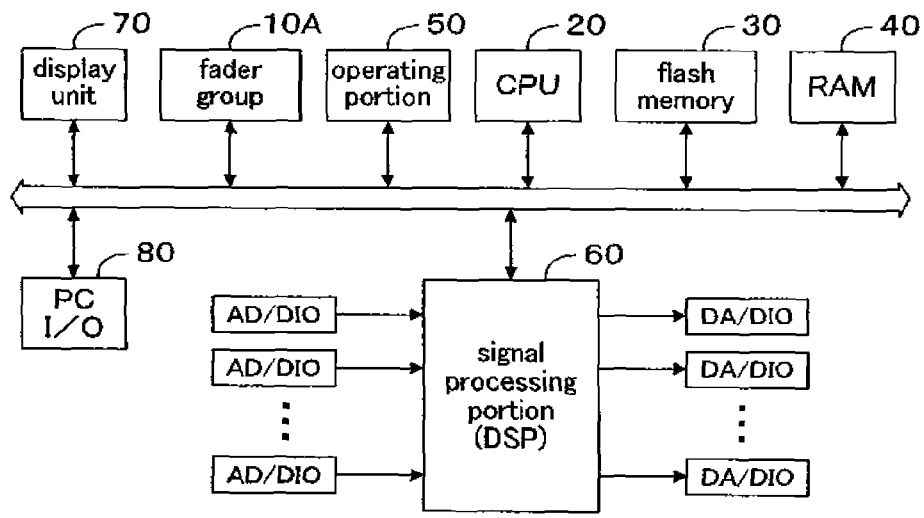
FIG. 3 is a block diagram showing a main part of the digital mixer.

An embodiment of the present invention will now be described with reference to the drawings. FIG. 1 is a perspective view of a main part of a fader device 10 used as a slide operating device applied to the embodiment. FIG. 2 is a front view showing a main part of a panel 100 of a digital mixer which employs the fader device 10. FIG. 3 is a block diagram showing a main part of the digital mixer. FIG. 2 shows the panel 100 when viewed from the front. FIG. 2 illustrates parts corresponding to input channels such as a microphone input and a line input. The panel 100 is separated into a plurality of columns each having a plurality of operators and each corresponding to a channel. Each channel is provided with a pan control operator 81, a selector operator 82, a display screen 83, an activation/deactivation setting operator 84, an operating knob 6, a test-listen switch 85. The panel 100 also has a display switch 86 for switching display on the display screens 83.

The operating knob 6 is an operator of the fader device 10 provided on the back of the panel 100. By moving the operating knob 6 up or down, a parameter value provided for a function assigned to a corresponding channel is controlled. On the fader device 10, which is a motor-driven fader, the operating knob 6 is moved up or down by actuation of a motor 2 which will be described later. As for the moving direction of the operating knob 6, for the sake of conveniences the downward direction is referred to as direction "A", while the upward direction is referred to as direction "B". For instance, this digital mixer is allowed to connect to an external apparatus such as a computer which is not shown to receive sequence data from the external apparatus to automatically mix input signals. In such a case, the operating knobs 6 of the respective channels move in real-time so that their corresponding parameters values are appropriately set for respective scenes defined by the sequence data. In addition, the operating knobs 6 of the respective channels move upon power-up and at initial settings caused by switching of settings provided for functions assigned to the channels. Furthermore, fader devices for stereo master which are not shown are similar to the fader devices 10.

As shown in FIG. 3, the digital mixer of the embodiment has a CPU 20, a flash memory 30, a RAM 40, an operating portion 50, a signal processing portion 60, a display unit 70, a PC input/output circuit (I/O) 80, and a fader group 10A composed of the fader devices 10. The signal processing portion 60, which is composed of a DSP, is allowed to connect with a plurality of either of analog/digital conversion boxes or digital interface boxes (AD/DIO) via an input connector. Each analog/digital conversion box, which is capable of installing up to eight A/D conversion boards, is allowed to specify the gain and the polarity every analog/digital conversion input. Each digital interface box is capable of installing up to eight I/O boards. Furthermore, the signal processing portion 60 is allowed to connect with a plurality of either of digital/analog conversion boxes or digital interface boxes (DA/DIO) via an output connector. Each digital/analog conversion box, which is capable of installing up to eight D/A conversion boards, is allowed to specify the gain and the polarity every digital/analog conversion output. The signal processing portion 60 performs mixing in accordance with various functions specified by the CPU 20.

Operating programs executed by the CPU 20 are stored in the flash memory 30. The CPU 20 detects operations of the respective fader devices 10, 10, . . . of the fader group 10A and operations of the operating portion 50, and controls the mixing executed by the signal processing portion 60 and the display of the display unit 70. The CPU 20 also controls actuation of later-described motors 2 of the fader devices 10 to perform the above-described control of the position of the operating knobs 6 of the fader devices 10.

Figure 5:
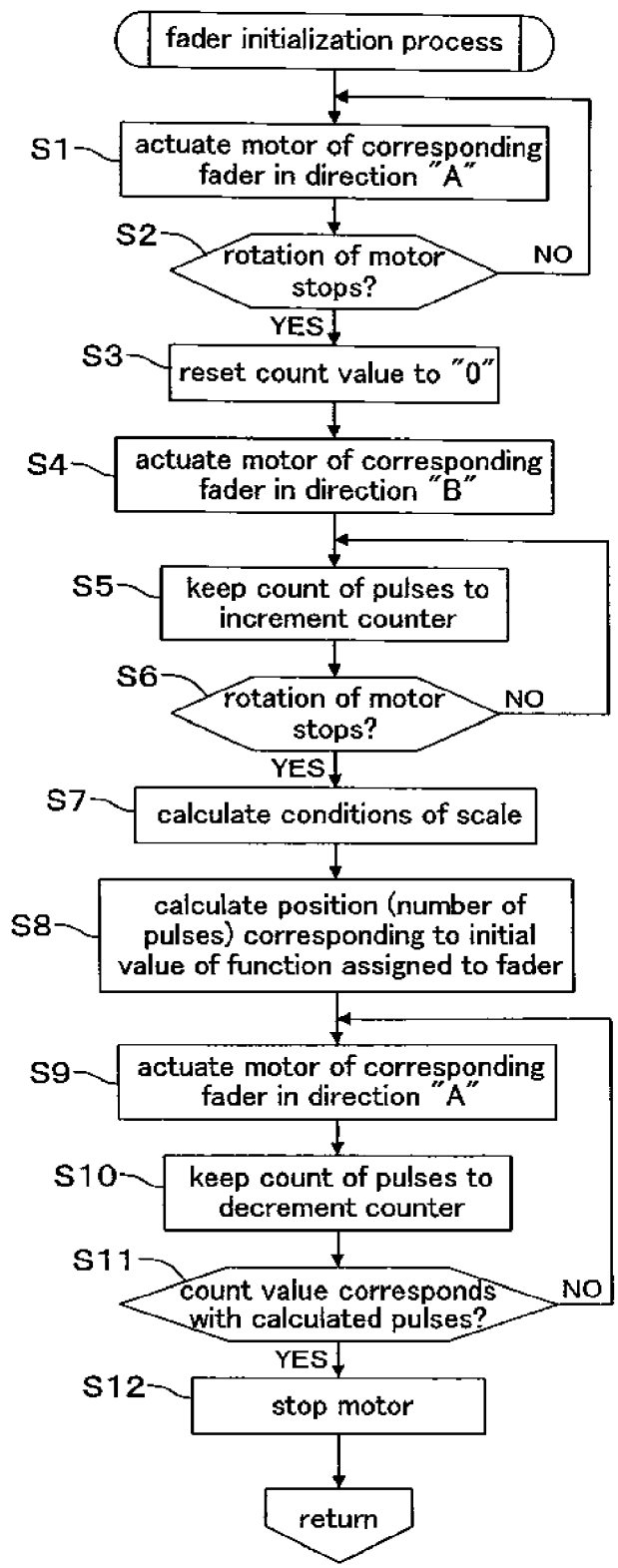
FIG. 5 is a flowchart of a fader initialization process executed in the embodiment.
Figure 6:
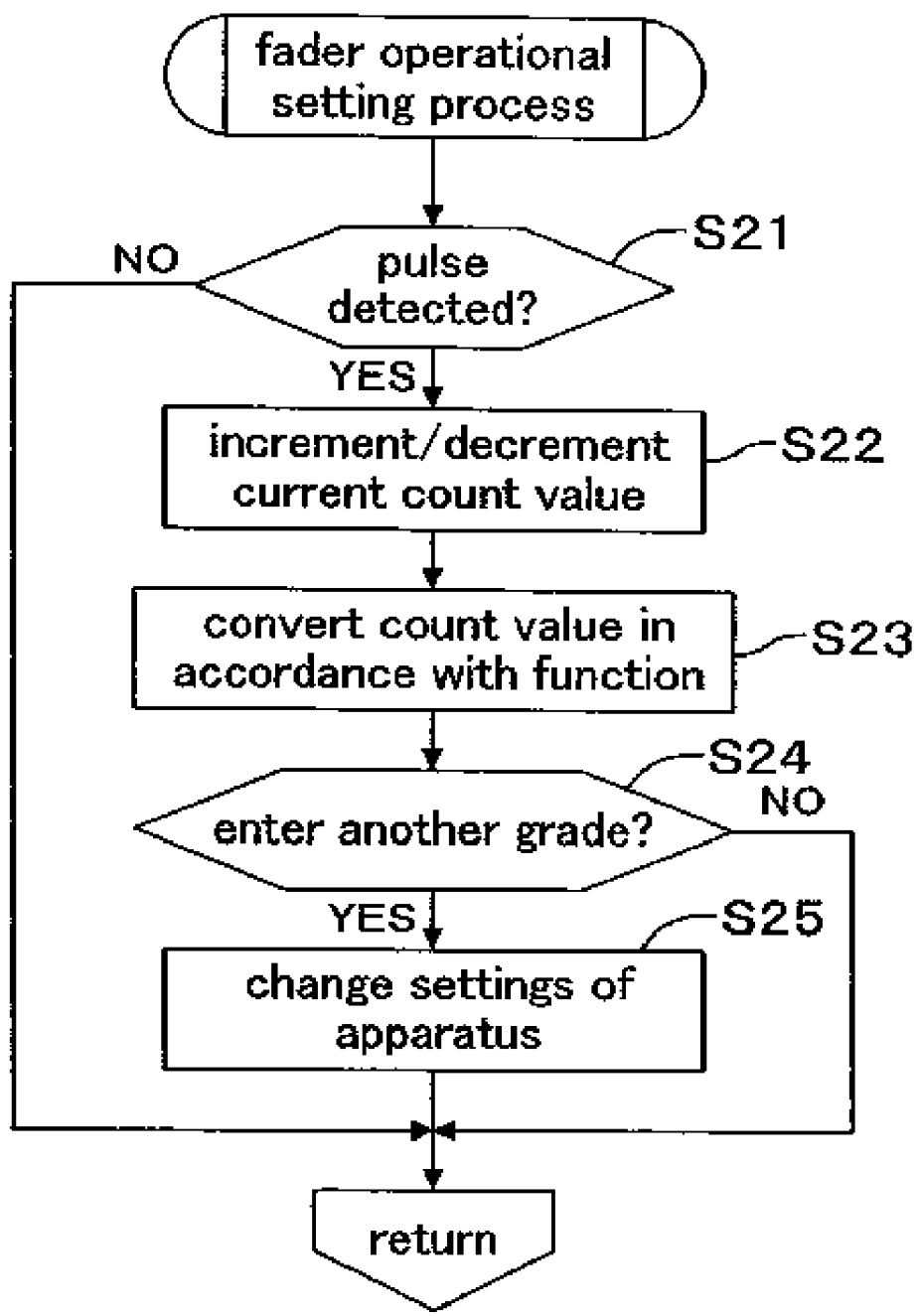
FIG. 6 is a flowchart of a fader operational setting process executed in the embodiment.

FIG. 5 is a flowchart of a fader initialization process executed by the CPU 20, while FIG. 6 is a flowchart of a fader operational setting process executed by the CPU 20. The fader initialization process shown in FIG. 5 is carried out when the power of the mixer apparatus has been turned on or when the settings of a function assigned to any of the fader devices 10 has been changed. In step S1, the motor 2 of the corresponding fader device 10 is actuated in the direction "A" and the operating knob 6 is moved to an initial position until the stop of the rotation of the motor 2 is detected at step S2. More specifically, the detection of abnormal load on the motor 2 indicates a state where the operating knob 6 contacts a later-described stopper, so that the motor 2 stops. If the motor 2 is stopped, the CPU 20 proceeds to step S3 to reset a count value of the fader device 10 to "0".

In step S4, the rotation of the motor 2 is reversed, so that the motor 2 is actuated in the direction "B". In step S5, the CPU 20 increments the reset count value in accordance with separately detected pulses, while the CPU 20 checks, in step S6, whether the motor 2 stops. If the motor 2 stops, the CPU 20 proceeds to step S7 to calculate conditions of a scale. More specifically, steps S3 to S6 allow the CPU 20 to obtain a total count value for the entire scale. Assume that a parameter provided for a function assigned to this fader device 10 has a scale of 64, for instance, a count value per grade of the parameter can be obtained by dividing the total count value by 64.

In step S8, the CPU 20 calculates a position (the number of pulses) corresponding to an initial value of the function currently assigned to the fader device 10. In step S9, the CPU 20 actuates the motor 2 in the direction "A". In step S10, the CPU 20 decrements the count value in accordance with separately detected pulses, while the CPU 20 checks, in step S11, whether a current count value corresponds with a position indicated by the calculated pulses. If a current count value corresponds with the position indicated by the calculated pulses, the CPU 20 proceeds to step S12 to stop the motor 2 and then returns to the previous routine. As described above, these steps achieve initial settings on the function assigned to this fader device 10.

In the fader operational setting process of FIG. 6, the CPU 20 monitors pulses output from the fader device 10 (magnetic sensor 7). If the CPU 20 detects a pulse in step S21, the CPU 20 proceeds to step S22. In step S22, the CPU 20 increments or decrements a current count value in accordance with the phase of the pulse. In step S23, the CPU 20 converts the count value into a parameter in accordance with a function assigned to this fader device 10. In step S24, the CPU 20 determines whether the parameter value has entered another grade. In other words, the CPU 20 determines whether the parameter value is to be refreshed. If so, the CPU 20 proceeds to step S25 to change settings of the apparatus. If not, the CPU 20 returns to the previous routine.

Next, the fader device 10 will be described in detail with reference to FIG. 1. A frame of the fader device 10 of this embodiment is composed of a side plate 1a which is square to the undersurface of the panel 100, a side plate (not shown) provided frontward and paired with the side plate 1a, and an upper frame 1b having a horseshoe cross section. To one end of the upper frame 1b, the motor 2 is fastened. With mounting hardware 11A, 11B provided on the both sides of the frame 1b, the entire frame is mounted to the undersurface of the front panel 100. On the both ends of the side plate 1a, nails 12a, 12a, 12b, 12b are raised by bending process. Between the nails 12a, 12a, a moving guide 3 which composes a "linear scale" is mounted, while a secondary moving guide 4 is mounted between the nails 12b, 12b. To the moving guide 3 and the secondary moving guide 4, a moving block 5 is mounted slidably along the longitudinal direction of the moving guide 3 and the secondary moving guide 4. To the moving block 5, a lever 6a which is part of the operating knob 6 is fastened.

Because of the above-described configuration, manual to-and-fro operations of the operating knob 6 cause the moving block 5 to travel along the moving guide 3 and the secondary moving guide 4. If the moving block 5 travels toward the motor 2 (direction "A"), so that the lever 6a of the operating knob 6 contacts the mounting hardware 11A, the moving block 5 cannot travel any further. If the moving block 5 travels in the direction opposite to the motor 2 (direction "B"), so that the lever 6a of the operating knob 6 contacts the mounting hardware 11B, the moving block 5 cannot travel any further. That is, the mounting hardware 11A, 11B serves as "stoppers" which limit a range within which the operating knob 6 is allowed to be operated manually.

To an actuation shaft of the motor 2 and the other end of the upper frame 1b, pulleys which are not shown and around which a timing belt is wound, respectively, are mounted. To the timing belts, an upper part of the moving block 5 is mounted. Because of this configuration, the rotation of the motor 2 in the forward or reverse direction causes the moving block 5 to travel to-and-fro along the moving guide 3 and the secondary moving guide 4. Because of the configuration, the position of the operating knob 6 is controlled by the CPU 20 as described above. In a case where the motor 2 causes the operating knob 6 to travel, when the lever 6a contacts the mounting hardware 11A or 11B, it is considered that the rotation of the motor 2 stops (a load is detected) as explained in the description about the flowchart.

The moving block 5 is formed by resin. At the upper side of a square frame of the moving block 5, guide holes 5a, 5a through which the moving guide 3 is inserted are provided. At the lower side of the square frame, secondary guide holes 5b, 5b through which the secondary moving guide 4 is inserted are provided. To the inside of the frame, a substrate 5c is mounted. To the substrate 5c, the magnetic sensor 7 employed as a "sensor portion" is mounted. To the substrate 5c, a flat cable 7a for outputting signals from the magnetic sensor 7 is connected.

The moving guide 3 is composed of a non-magnetic stainless (18Cr-8Ni austenitic) shank 31 and a scale portion 32 formed by magnetizing a permanent magnetic member (Fe—Cr—Co). The scale portion 32 is polarized into the north pole and the south pole alternately as markings at a pitch of 330 μm, for example, in the longitudinal direction of the scale portion 32. The magnetic sensor 7 is opposed to the scale portion 32. The magnetic sensor 7 is provided with two magnetoresistive elements (MR elements), so that the magnetic sensor 7 detects magnetic poles (markings) of the scale portion 32 and outputs signals when the moving block 5 travels along the moving guide 3 which is used as a linear scale and the secondary moving guide 4. The detection signals of the magnetic sensor 7 are transferred to the CPU 20 and the like through the flat cable 7a.

As for the magnetic poles provided on the scale portion 32, the magnetization of the scale portion 32 ranges to a position "A" but does not range beyond the position "A". The position "A" is a position where the magnetic sensor 7 is opposed to the scale portion 32 when the lever 6a of the operating knob 6 is positioned where the lever 6a contacts the mounting hardware 11A (stopper). The magnetization of the scale portion 32 ranges to a position "B" but does not range beyond the position "B". The position "B" is a position where the magnetic sensor 7 is opposed to the scale portion 32 when the lever 6a of the operating knob 6 is positioned where the lever 6a contacts the mounting hardware 11B (stopper). More specifically, areas outside the position "A" and the position "B", in other words, areas outside the positions where the operating knob 6 is stopped by the mounting hardware 11A, 11B (stoppers), are dead zones 3A, 3B blind to the magnetic sensor 7 (sensor portion).

Along with the travel of the moving block 5, the magnetic sensor 7 outputs pulse signals corresponding to reversed polarities of the north pole and the south pole provided on the scale portion 32. In accordance with the number of the pulse signals, the amount (length) of travel of the traveling block 5 (operating knob 6) can be detected. The scale portion 32 has magnetic poles of two lines, for example. The pattern of the magnetic poles has a phase shift equivalent to π/2 in the direction of the length of the scale portion 32. Since the magnetic sensor 7 outputs out-of-phase pulse signals, the direction of the travel of the moving block 5 can be found out on the basis of the forward/reverse direction of the phase shift. The scale portion 32 may have a pattern of NSNS . . . without phase shift, while the magnetic sensor 7 may have sensors arranged with π/2 phase shift.

Figure 4A:
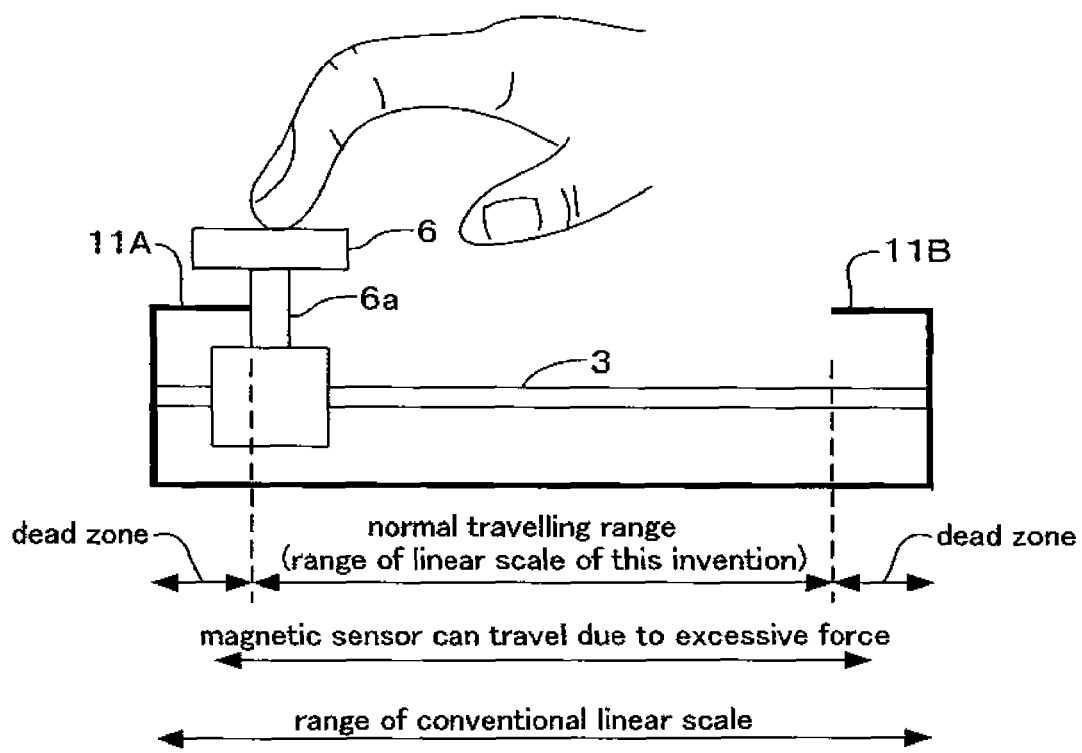
FIGS. 4A to 4C are conceptual illustrations illustrating workings of the embodiment.
Figures 4B, 4C:
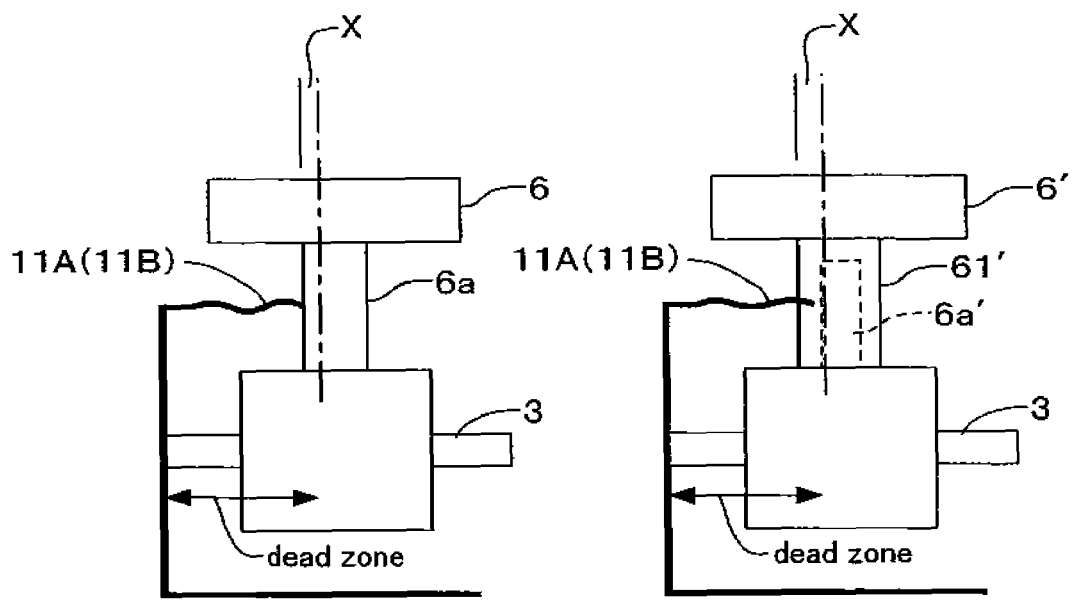

FIGS. 4A to 4C are conceptual illustrations illustrating workings of the embodiment. In normal operation of the operating knob 6 as shown in FIG. 4A, a range within which the operating knob 6 is allowed to travel is limited, since the lever 6a contacts the mounting hardware 11A (stopper) or the mounting hardware 11B (stopper). This is an occasion where the operating knob 6 is manually operated by a user with moderate force or where the operating knob 6 is actuated by the motor 2. If the user manually operates the operating knob 6 quickly or strongly, however, an excessive force is exerted on the operating knob 6, resulting in a deformation of the mounting hardware 11A (11B) as shown in FIG. 4B. Even if the mounting hardware 11A (11B) can escape deformation, the magnetic sensor 7 can travel beyond the normal travelling range to overshoot the range by "X" due to an inertial force of the moving block 5 or the magnetic sensor 7. Alternatively, in a case where an operating knob 6' formed of resin is mounted to a lever 6a' through a boss 61' so that the boss 61' contacts the mounting hardware 11A (11B) as shown in FIG. 4C, the mounting hardware 11A (11B) can be pierced into the boss 61', also resulting in an overshoot by "X" beyond the range within which the sensor normally travels.

In such occasions, if the areas outside the normal travelling range are also polarized as markings as shown as a conventional range shown in FIG. 4A, the magnetic sensor is forced to keep unexpected count outside the normal travelling range. In the scale portion 32 of this embodiment, however, areas outside the points where the mounting hardware 11A, 11B (stoppers) prevent the operating knob 6 in normal operations from traveling beyond the normal travelling range are the non-magnetized dead zones 3A, 3B blind to the magnetic sensor 7, eliminating such inconvenience.

The above-described embodiment is an example in which the scale portion 32 is formed on the moving guide 3 located on the operating knob 6 side. However, the scale portion may be formed on the secondary moving guide 4 side.

In addition, the embodiment employs the magnetic sensor portion, however, an optical sensor portion may be employed. In this case, for example, on the undersurface of the moving guide 3 shown in FIG. 1, two lines of a certain periodic black and white barcode-like pattern may be provided as marking, while a photosensor composed of a light-emitting diode, a photo diode, and the like may be provided as a replacement for the magnetic sensor 7, so that pulse signals having the phase difference corresponding to the two lines of the black and white pattern are output as detection signals. In this case of the optical sensor portion as well, areas outside the normal travelling range are not subjected to markings (the black and white pattern) so that the scale portion has dead zones which are blind to the optical sensor portion.

In the above-described embodiment, the fader device of the digital mixer is employed as the slide operating device, however, the present invention may be applied to any slide operating devices applied to any other electronic apparatuses.

What is claimed is:

1. An incremental encoding slide operating device which detects a position of an operating knob by sensing markings provided on a linear scale, the slide operating device comprising:
    stopper portions which limit a travelling range on the linear scale;
    a sensor portion which travels along the linear scale in synchronization with travelling of the operating knob and senses the markings, the sensor portion comprising a single sensor sensing markings provided on a linear scale; and
    dead zones which are provided on the linear scale, which coincide with the stopper portions, which lack the markings such that the sensor portion is insensible in the dead zones, and which are entered by the sensor portion.

2. A slide operating device according to claim 1, wherein the stopper portions limit the travelling range of the operating knob by contacting part of the operating knob.

3. A slide operating device according to claim 1, wherein the operating knob and the sensor portion travel in the direction of the front of a user.

4. A slide operating device according to claim 1, wherein the sensor portion is composed of a magnetic element.

5. A slide operating device according to claim 1, wherein the sensor portion is composed of an optical element.

6. A slide operating device according to claim 1, wherein a plurality of functions are selectively assigned to the operating knob.

7. A slide operating device according to claim 1 further comprising:
    a processor which, on travelling of the operating knob, increments or decrements a count value in order to detect a position of the operating knob in response to the sensing of the markings by the sensor portion.

8. A slide operating device according to claim 1 further comprising:
    a motor for actuating the operating knob.

* * * * *